(12) United States Patent
Fitrandolph

(10) Patent No.: US 6,944,422 B2
(45) Date of Patent: Sep. 13, 2005

(54) METHOD AND DEVICE FOR DETECTING AN INTERFERENCE CONDITION

(75) Inventor: David K. Fitrandolph, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 218 days.

(21) Appl. No.: 10/418,342

(22) Filed: Apr. 18, 2003

(65) Prior Publication Data

US 2004/0209626 A1 Oct. 21, 2004

(51) Int. Cl.[7] .............................................. H04K 3/00
(52) U.S. Cl. .................... 455/1; 455/63.1; 455/114.2; 455/278.1; 455/296; 342/357.06; 375/148
(58) Field of Search ......................... 455/1, 3.02, 63.1, 455/427, 114.2, 278.1, 296; 342/352, 357.03–357.06; 375/147, 148, 149, 346

(56) References Cited

U.S. PATENT DOCUMENTS

| | | | | |
|---|---|---|---|---|
| 5,081,462 A | * | 1/1992 | Tachita et al. ............... | 342/352 |
| 5,101,416 A | * | 3/1992 | Fenton et al. ................ | 375/150 |
| 5,363,401 A | | 11/1994 | Lucas et al. | |
| 5,402,441 A | * | 3/1995 | Washizu et al. ............ | 375/150 |
| 5,847,678 A | * | 12/1998 | Tachita ................... | 342/357.03 |
| 5,923,287 A | * | 7/1999 | Lennen .................. | 342/357.06 |
| 6,107,960 A | | 8/2000 | Krasner | |
| 6,215,982 B1 | * | 4/2001 | Trompower ................ | 455/63.3 |
| 6,363,123 B1 | * | 3/2002 | Balodis ....................... | 375/316 |
| 6,448,925 B1 | * | 9/2002 | Shridhara .............. | 342/357.02 |
| 6,546,040 B1 | * | 4/2003 | Eschenbach ................ | 375/140 |
| 6,757,324 B2 | * | 6/2004 | Fitzrandolph ............... | 375/147 |
| 2002/0044614 A1 | * | 4/2002 | Molnar et al. .............. | 375/346 |

* cited by examiner

Primary Examiner—Stephen D'Agosta
(74) Attorney, Agent, or Firm—Kevin D. Wills

(57) ABSTRACT

A method of detecting a jamming signal (304) in a wireless device (102) includes providing a plurality of channels (401), wherein each of the plurality of channels has an NCO frequency (428, 429), and receiving a channel lock indicator (430, 431) for each of the plurality of channels. A jamming signal is detected if the NCO frequency of each of the plurality of channels differs by an integer multiple of an inverse of a pseudorandom noise code period (424, 425). A wireless device includes a plurality of channels, wherein each of the plurality of channels has an NCO frequency. A frequency tracking loop for each of the plurality of channels outputs a channel lock indicator for each of the plurality of channels. A jamming detection module receives the channel lock indicator and the NCO frequency from each of the plurality of channels. The jamming detection module detects an interference condition if the NCO frequency of each of the plurality of channels differs by an integer multiple of an inverse of a pseudorandom noise code period.

40 Claims, 4 Drawing Sheets

500

600

METHOD AND DEVICE FOR DETECTING AN INTERFERENCE CONDITION

BACKGROUND OF THE INVENTION

The Global Positioning System (GPS) is a satellite based navigation system having a network of 24 satellites orbiting the earth 11,000 nautical miles in space, in six evenly distributed orbits. Each satellite orbits the earth every twelve hours. A prime function of the GPS satellites is to serve as a clock. Each satellite derives its signals from an onboard 10.23 Mega Hertz (MHz) Cesium atomic clock. Each satellite transmits a spread spectrum signal with its own individual pseudorandom noise (PN) code. By transmitting several signals over the same spectrum using distinctly different pseudorandom noise coding sequences the satellites may share the same bandwidth without interfering with each other. These coding sequences are a time series of bits, called "chips". The code used in the non-military portion of the GPS system is 1023 chips long and is sent at a rate of 1.023 megachips per second yielding a time mark (i.e. a "chip") approximately once every micro-second. The sequence repeats once every millisecond and is called the course acquisition (C/A) code.

Ground based GPS receivers may use a variant of radio direction finding (RDF) methodology, called triangulation, in order to determine the position of the ground based GPS receiver. The triangulation method depends on the GPS receiver obtaining a time signal from a satellite. By knowing the travel time of a GPS signal from a satellite to the GPS receiver, the distance from the receiver to the satellite can be calculated. If, for example, the GPS satellite is 12,000 miles from the GPS receiver then the receiver must be somewhere on the location sphere defined by the radius of 12,000 miles from that satellite. If the GPS receiver then ascertains the position of a second satellite it can calculate the receiver's location based on a location sphere around the second satellite. The two spheres intersect and form a circle, and so the GPS receiver must be located somewhere within that location circle. By ascertaining the distance to a third satellite the GPS receiver can project a location sphere around the third satellite. The third satellite's location sphere will then intersect the location circle produced by the intersection of the location spheres of the first two satellites at just two points. By determining the location sphere of one more satellite, whose location sphere will intersect one of the two possible location points, the precise position of the GPS receiver is determined. As a consequence, the exact time may also be determined, because there is only one time offset that can account for the positions of all the satellites.

There are multiple ways of using the radio spectrum to communicate. For example, in frequency division multiple access (FDMA) systems, the frequency band is divided into a series of frequency slots and different transmitters are allotted different frequency slots. In time division multiple access (TDMA) systems, the time that each transmitter may broadcast is limited to a time slot, such that transmitters transmit their message one after another, only transmitting during their allotted period. With TDMA, the frequency upon which each transmitter transmits may be a constant frequency or may be continuously changing (frequency hopping). A third way of allotting the radio spectrum to multiple users is through the use of code division multiple access (CDMA) also known as spread spectrum. In CDMA all the users transmit on the same frequency band all of the time. Each user has a dedicated code that is used to separate that user's transmission from all others. This code is commonly referred to as a spreading code, because it spreads the information across the band. It is also referred to as a pseudorandom noise (PN) code.

To decode the transmission at the receiver it is necessary to "despread" the code. The despreading process takes the incoming signal and multiplies it by the spreading code and sums the result. This process is commonly known as correlation, and it is commonly said that the signal is correlated with the PN code. The result of the despreading process is that the original data may be separated from all the other transmissions, and the original signal may be recovered.

Jamming interference from a variety of sources can disrupt the process of finding and decoding GPS signals, which can cause errors. These errors may build up if jamming continues. As a result of these jamming-induced built up errors, significant errors in position may occur at the GPS receiver.

In particular for spread spectrum systems such as GPS, it is possible for a narrowband signal to jam a GPS receiver. Due to the nature of the demodulating process in a GPS receiver, a strong signal going into a despreader results in a strong signal coming out of the despreader. A receiver uses the despreader output downstream for four primary purposes: 1) to demodulate transmitted data, 2) to determine the signal strength of the spread spectrum signal, 3) to determine if the receiver has acquired the GPS signal, and 4) to maintain a lock on the signal in order to continue to track the signal. If a narrowband signal enters the despreader, the high amplitude output of the despreader can deceive the receiver into thinking it is still properly tracking the spread spectrum signal.

Prior art methods for detecting jamming includes frequency based analysis of a spread spectrum signal at the pre-detection stage, for example analyzing the frequency-domain representation of the received signal. This requires extensive use of the Fast Fourier Transform (FFT), which burdens the processor and memory of a receiver as the FFT output over multiple time intervals must be stored during the processing of information. A new method of jamming detection, which can be readily added to an existing receiver with no additional hardware requirement and impose a minimum burden on the processor and memory is desirable.

Accordingly, there is a significant need for an apparatus and method that overcomes the deficiencies of the prior art outlined above.

BRIEF DESCRIPTION OF THE DRAWINGS

Referring to the drawing.

Figure 1:
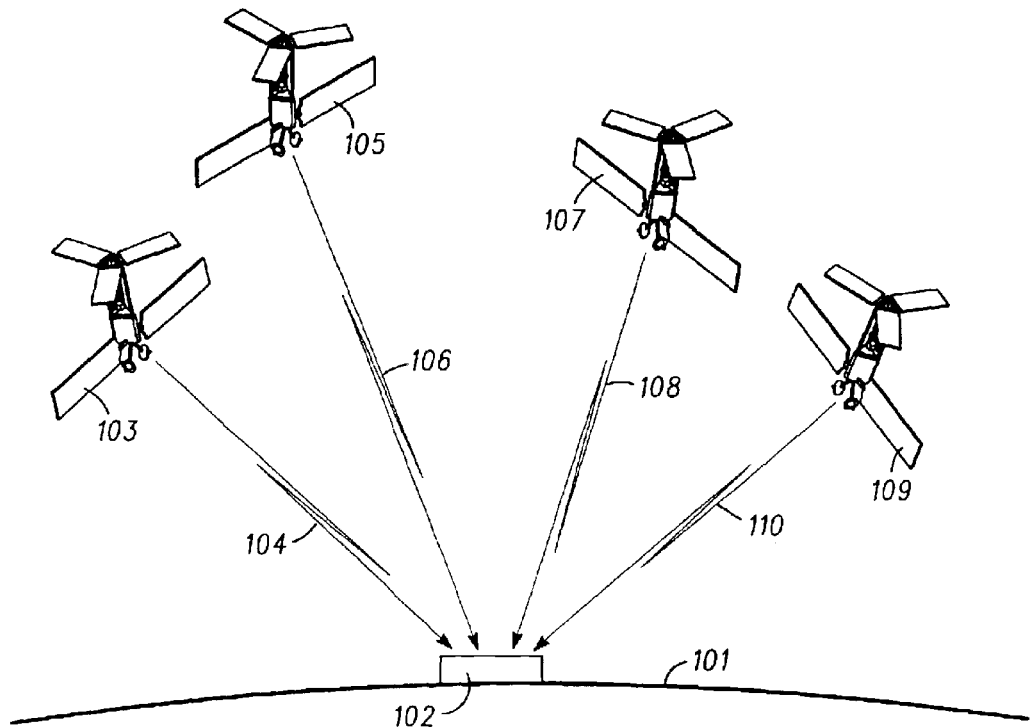
FIG. 1 is an illustration of a wireless device concurrently receiving signals from four GPS satellites.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 is an illustration of a wireless device 102 on earth 101 concurrently receiving signals from four GPS satellites 103, 105, 107 and 109 in space. Wireless device 102 can be any communication device adapted to receive wireless communication signals, such as a GPS receiver, or any device incorporating a GPS receiver, such as a cellular telephone having GPS capability. The four GPS satellites 103, 105, 107, and 109 continually broadcast a high accuracy time signal, which is received by wireless device 102. The signal from each of the GPS satellites 103, 105, 107 and 109 must respectively travel different paths 104, 106, 108 and 110. The satellites broadcast data about their position along with other information. By knowing the positions of the satellites and using an estimated position, the distance of the receiver from the satellites can be computed. These distances can then be used to determine a more accurate position of the receiver.

Figure 2:
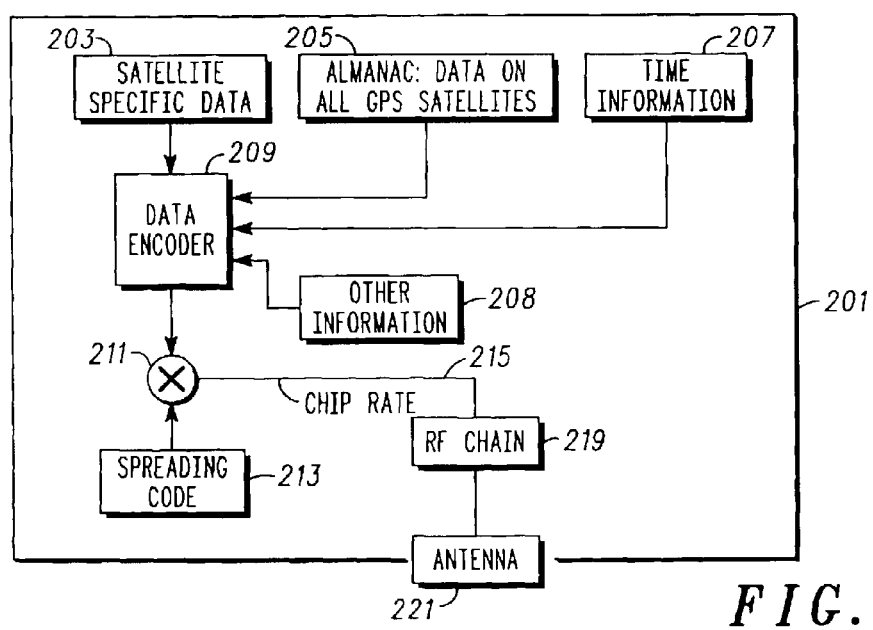
FIG. 2 is a block representation of a portion of a GPS satellite.

FIG. 2 is a block representation of a portion of a GPS satellite 201. Block 203 represents satellite specific data that will be encoded for transmission. This data includes location information for the satellite, as well as satellite clock corrections and error information. Block 205 represents what is commonly referred to as almanac data, which allows the receiver to roughly know the position of all of the GPS satellites. Block 207 represents the current time, which is generated by the high accuracy atomic time standard within the satellite. Block 208 is other information pertinent to accurate position estimation. The information from blocks 203, 205, 207, and 208 are encoded in the proper format by the data encoder 209. The encoded data is then sent to the spreading unit 211, which multiplies the encoded data by one of 32 spreading codes 213, each code representing a particular satellite in orbit. The resulting data stream 215 has a chip rate of 1.023 megachips per second and a data rate of 50 bits per second. The chip rate is essentially the symbol rate of the spreading code. The data stream 215 is then sent to the RF circuitry 219, where the data stream is filtered, amplified, modulated, and upconverted to a carrier frequency of 1574.2 Megahertz (MHz). Those are typical processes done in RF circuitry, as is well known in the art. The resulting signal is then sent to the antenna 221 of the satellite for broadcast.

Figure 3:
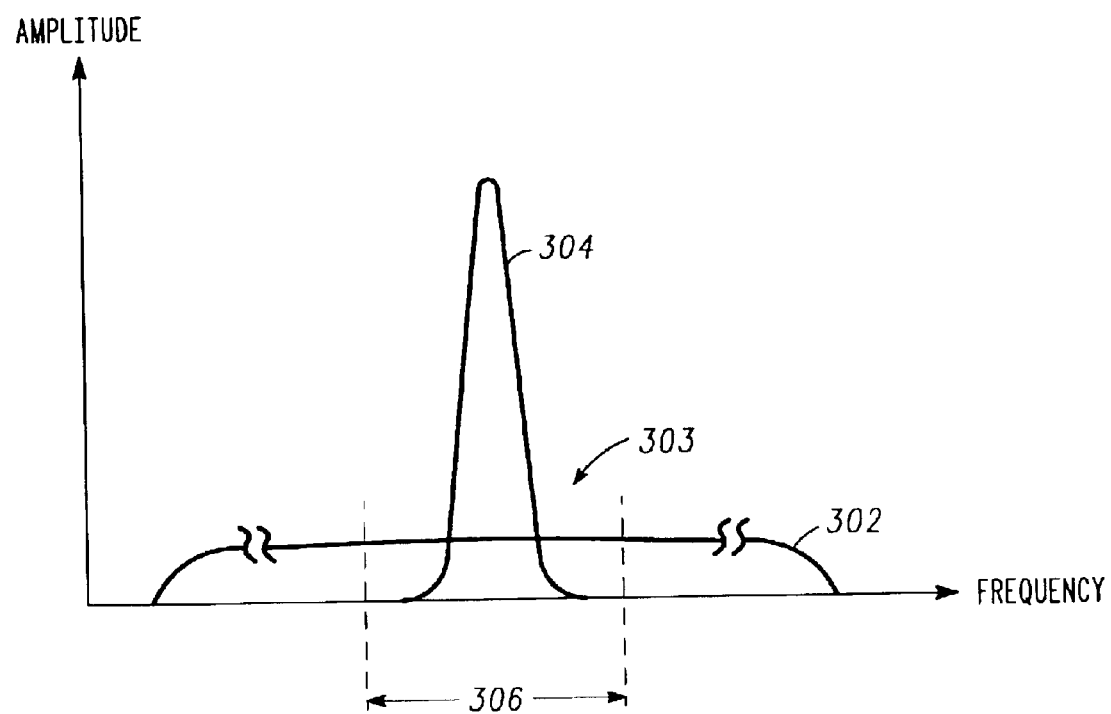
FIG. 3 is a spectral diagram according to an embodiment of the invention.

FIG. 3 is a spectral diagram 300 according to an embodiment of the invention. As shown in FIG. 3, a wireless communication signal into wireless device 102 can be a GPS signal 302, where the wireless device has an effective passband 306. GPS signal 302 is a relatively low-strength signal with a data rate of 50 bits per second (bps).

A jamming signal 304 is a subset of interfering signals. Interference can be a spurious signal that disrupts another signal, making it difficult or even impossible to interpret the original signal especially if the interfering signal is strong relative to the original signal. Spurious signals abound from many sources, high frequency digital circuits can generate spurious noise, electric motors can generate a great amount of wide spectrum noise as they make and break contacts, car ignition systems can broadcast noise, and even natural phenomenon such as lightning are forms of RF interference. There are certain interfering signals that will actually jam a CDMA receiver. Such signals can be due to wideband high-powered noise at the GPS L1 band, or even from a signal source on the same PC board that the GPS receiver is on. Given that GPS receivers typically are placed on the same circuit boards as cell phone RF circuitry, this type of jamming can occur very easily.

In addition to the sources of noise stated above, GPS receivers are also susceptible to interference from mobile GSM telephones. One of the GSM bands is 200 MHz away from the GPS band. Due to the high sensitivity of GPS receivers, a GSM transmission can cause interference problems with the GPS receiver, even though the GSM frequency band does not overlap the GPS band. Also, when a GSM telephone (or any other RF circuit) transmits, unwanted tones can be created from the RF circuitry of the transmitter. If any of these tones falls within the passband of the GPS RF circuitry (GPS band, intermediate frequency bands of RF chain) and is coupled to the GPS circuitry, narrowband jamming can easily occur.

If a much stronger jamming signal 304, for example and without limitation, a continuous wave (CW) signal, occupies the effective passband 306, the output of despreader of wireless device 102 will always have a high output magnitude, which will cause jamming of the GPS receiver on that channel. The presence of jamming signal 304 can create an interference condition 303 where the GPS receiver locks onto the jamming signal 304 as opposed to the proper GPS signal 302.

Figure 4:
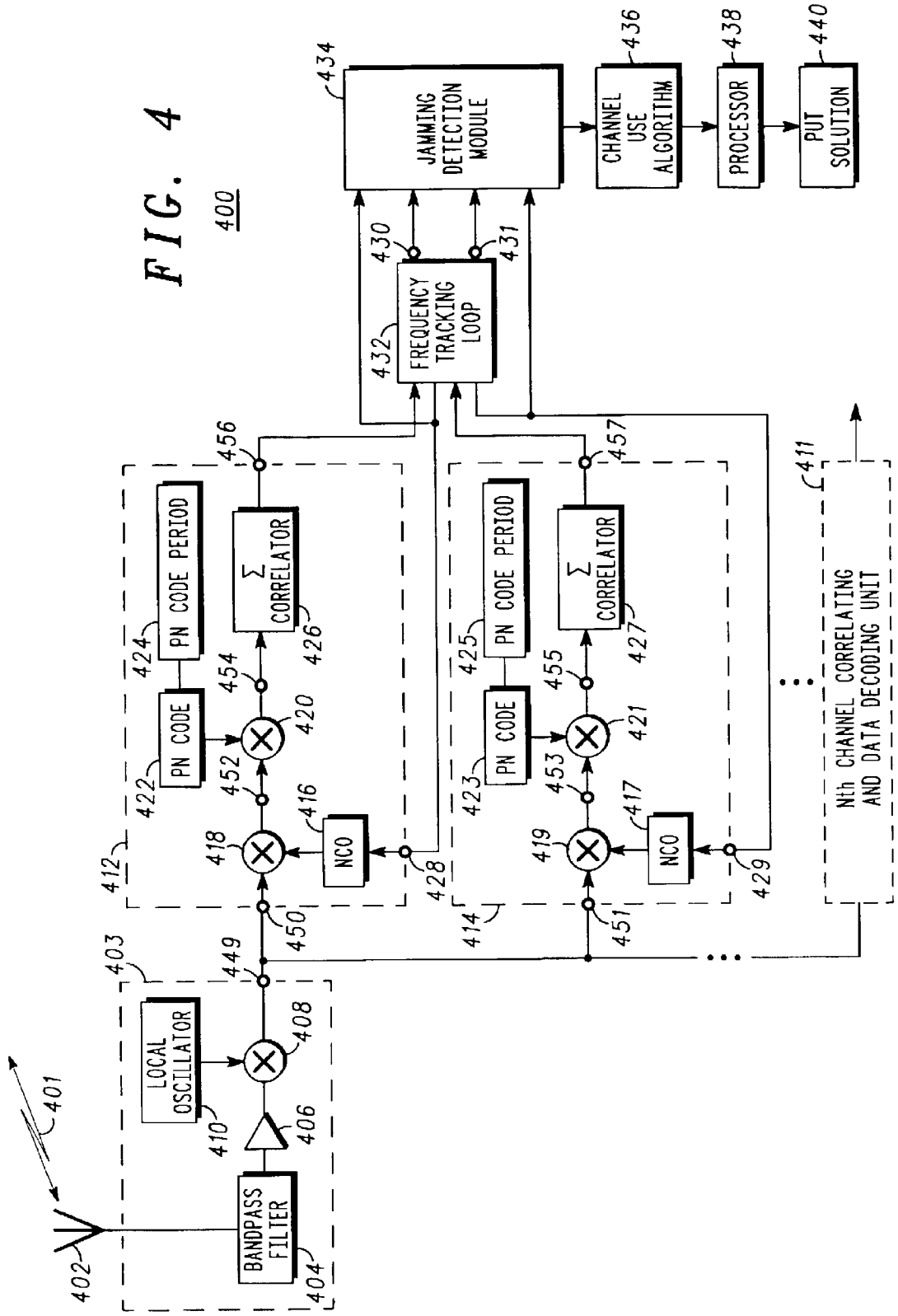
FIG. 4 is a block diagram of a GPS receiver according to an embodiment of the invention.

FIG. 4 is a block diagram of a GPS receiver 400 according to an embodiment of the invention. In an embodiment, GPS receiver 400 can be incorporated into wireless device 102. As shown in FIG. 4, a plurality of channels 401 are received at antenna 402, which is coupled to an RF circuit 403. In an embodiment, plurality of channels 401 can be received from GPS satellites such as shown in FIG. 1, in which case plurality of channels 401 can be plurality of GPS channels 401. RF circuit comprises, among other things, a bandpass filter 404, which filters out to a high degree other signals and noise outside the frequency band of GPS system. Bandpass filter 404 is coupled to amplifier 406, which amplifies the signal from bandpass filter 404. Mixer 408 mixes the output of amplifier 406 with a signal from local oscillator 410. In this way, mixer 408 downconverts the frequency of the output of amplifier 406 as is known in the art. Mixer outputs a composite signal 449.

Local oscillator 410 can include a frequency synthesizer, which uses a voltage controlled oscillator and a phase locked loop to produce a signal that is phase locked to a reference oscillator. Reference oscillator (not shown for clarity) can be included on the GPS receiver 400 or external to GPS receiver on wireless device 102. Oscillator is typically a crystal oscillator and may be provided with temperature compensation circuitry.

Composite signal 449 from RF circuit 403 is a composite of all satellite signals that GPS receiver 400 can receive at that particular time and location on the earth. To decode an individual satellite's data stream, the composite signal 449 must be correlated with the correct pseudorandom noise code.

GPS receivers are provided with multiple signal processing channels, with each channel corresponding to a particular GPS satellite, so that GPS receiver 400 can process GPS signals from several GPS satellites at once. As discussed above, GPS receiver 400 must extract data from several satellites in order to determine its position. Therefore, subsequent to downconversion in RF circuit 403, composite signal 449 enters data correlating and decoding units 412, 414. Each data correlating and decoding unit 412, 414 extracts data from a different GPS satellite signal using pseudorandom noise (PN) codes as described above. GPS receiver 400 can have can have any number of data correlating and decoding units up to an $N^{th}$ channel data correlating and decoding unit 411. In an embodiment, GPS receiver 400 has 12 data correlating and decoding units enabling GPS receiver 400 to lock onto up to 12 signals from 12 separate GPS satellites.

First channel data correlating and decoding unit 412 receives composite signal 449 from RF circuit 403, which enters mixer 418 and is mixed with a signal from numerically controlled oscillator (NCO) 416. When GPS receiver 400 is searching for a signal, NCO 416 will roam a specified bandwidth in the spectrum in order to find first signal 450, which corresponds to a signal from a certain GPS satellite. Mixer 418 combines first channel NCO frequency 428 from NCO 416 and first signal 450 to produce signal 452 that has an approximately zero Hz carrier frequency. In effect, first channel NCO frequency 428 defines the overall doppler frequency of the one of the plurality of GPS channels 401. This overall doppler frequency is associated with the clock drift, user-satellite velocity and intended carrier frequency of first signal 450. Ideally, signal 452 has a carrier frequency of 0 Hz. First NCO channel frequency 428 is controlled by frequency tracking loop 432 in order to keep signal 452 inside the effective passband 306 of the correlator 426 (i.e. baseband).

Signal 452 is then combined with PN code 422 to create signal 454. The PN code 422 has a discrete component that is comprised of a series of spikes. The series of spikes in the discrete component are separated from each other in frequency by the inverse of the PN code period 424. For GPS coarse acquisition (C/A) code, the PN code period is substantially 1 millisecond (ms). As a result the series of spikes in PN code 422 are separated by the inverse of 1 ms, which is substantially 1 kHz.

Signal 454 is input to correlator 426, which outputs signal 456. Signal 456 is input into frequency tracking loop 432, which contains first channel NCO frequency 428 data so as to keep signal 454 centered in effective passband 306.

Second channel data correlating and decoding unit 414 operates analogously to first channel data correlating and decoding unit 412 by receiving composite signal 449 from RF circuit 403, which enters mixer 419 and is mixed with a signal from numerically controlled oscillator (NCO) 417. Mixer 419 combines second channel NCO frequency 429 from NCO 417 and second signal 451 to produce signal 453 to extract only the GPS signal and eliminate the carrier frequency for that signal. Second channel NCO frequency 429 is associated with the clock drift, user-satellite velocity and intended carrier frequency of second signal 451. Second channel NCO frequency 429 is controlled by frequency tracking loop 432 in order to keep signal 453 within effective passband 306 (i.e. baseband). Signal 453 is then combined with PN code 423 to create signal 455. The series of spikes in PN code 423 are also separated by the inverse of the PN code period 425 of 1 ms, which is substantially 1 kHz. Signal 455 is input to correlator 427, which outputs signal 457. Signal 457 is input into frequency tracking loop 432. This loop contains the second channel NCO frequency 429 data so as to keep signal 455 in effective passband 306. This same process is repeated for each of the plurality of GPS channels 401 received by GPS receiver 400. Both first and second channel data correlating and data decoding units 412, 414 comprise in phase (I) and quadrature phase (Q) components as is known in the art. However, only the in phase portion is shown here for clarity. Both the I and Q portions of each channel and GPS signal are used to determine the respective NCO frequencies 428 and 429 as is known in the art. Signal 456 and signal 457 can also be output to a data demodulator block and a PN code phase tracking loop (not shown for clarity).

Under normal operation, absent jamming signal 304, frequency tracking loop 432 will lock NCO 416 onto one of the plurality of GPS channels 401 within effective passband 306 for that particular channel. However, if a high enough amplitude jamming signal 304 is near the GPS channel carrier frequency within effective passband 306, GPS receiver 400 can easily lock onto jamming signal 304 and track it. Since direct spread spectrum signals (DSSS), such as GPS channel signals, tend to be low power signals, jamming signal 304 does not have to be powerful to jam GPS receiver 400. For example, and not meant to be limiting of the invention, jamming of GPS receiver 401 can occur if jamming signal 304 is 30 decibels (dB) higher than GPS signals.

A jamming signal 304 that is powerful enough can cause signal 454, 456 going into correlator 426, 427 to be of high amplitude, thereby causing correlator 426, 427 output signal 456, 457 to be of high amplitude. This will cause frequency tracking loop 432 to center NCO frequency 428, 429 on jamming signal 304. As a result of jamming signal being common to more than one of the plurality of GPS channels 401, first channel NCO frequency 428 and second channel NCO frequency 429 will differ by an integer multiple of an inverse of PN code period 424, 425.

In an embodiment, where the PN code period is substantially 1 ms, the inverse of the PN code period is substantially 1 kHz. Therefore, if GPS receiver 400 is locked onto jamming signal 304, and if the frequency tracking loop 432 indicates that it has locked onto the first channel and second channel, then the first channel NCO frequency 428 and second channel NCO frequency 429 will differ by an integer multiple of an inverse of a PN code period 424, 425. In an embodiment of the invention, an integer multiple of an inverse of PN code period 424, 425 is an integer multiple of 1 kHz.

In the embodiment shown in FIG. 4, jamming detection module receives first channel NCO frequency 428 and second channel NCO frequency 429 from frequency tracking loop 432. Jamming detection module 434 also receives first channel lock indicator 430 from frequency tracking loop 432 indicating that NCO 416 is locked onto a signal within its effective passband 306. In addition, jamming detection module 434 receives second channel lock indicator 431 from frequency tracking loop 432 indicating that NCO 417 is locked onto a signal within its effective passband 306. Upon receiving first and second channel NCO frequency 428, 429 and first and second channel lock indicator 430, 431, jamming detection module compares first channel NCO frequency and second channel NCO frequency to determine if they differ by an integer multiple of an inverse of a PN code period 424, 425. If they do, then an interference condition 303 very likely exists and first GPS channel and second GPS channel are locked onto jamming signal 304. For example, and without limitation, if first channel NCO frequency 428 and second channel NCO frequency 429 differ by substantially an integer multiple of 1 kHz (where the PN code period is substantially 1 ms), then an interference condition 303 exists.

The embodiment depicted in FIG. 4 and described above discusses two GPS channels received by GPS receiver 400. However, any number of GPS channels received by GPS receiver 400 are within the scope of the invention. For example, any number of channels and corresponding NCO frequencies within GPS receiver 400 can have NCO frequencies that differ by an integer multiple of an inverse of a PN code period and therefore indicate an interference condition 303 where corresponding GPS channels are locked onto jamming signal 304.

Jamming detection module 434 can be comprised of hardware, software or any combination of the two. Frequency tracking loop 432 and jamming detection module 434 can be part of processor 438 on GPS receiver 400 or be separate from processor 438.

Whether an interference condition 303 exists or not, can be communicated by jamming detection module 434 to channel use algorithm 436, which can use the results of jamming detection module 434 to take appropriate action in conjunction with processor 438 of GPS receiver 400. For example, if a plurality of GPS channels 401 are validated and therefore determined to be GPS signals and not a jamming signal 304, then those GPS channels can be included in a GPS position, time, velocity (PVT) solution 440. If any of the plurality of GPS channels 401 are invalidated and therefore determined to be locked onto jamming signal 304, one or more actions can be taken by channel use algorithm 436. In one embodiment, plurality of GPS channels locked onto jamming signal 304 can be reinitialized and an attempt made to reacquire the corresponding plurality of GPS channels. In another embodiment, plurality of GPS channels 401 can be excluded from the GPS PVT solution 440 without channel reinitialization. In still another embodiment, presence of interference condition 303 can be crosschecked against another jamming signal detection method for verification.

The software blocks depicted in FIG. 4 are computer program modules comprising computer instructions that are stored in a computer-readable medium such as memory. These software modules are merely representative of one embodiment of the invention. In other embodiments, additional modules could be provided as needed, and/or unneeded modules could be deleted.

Figure 5:
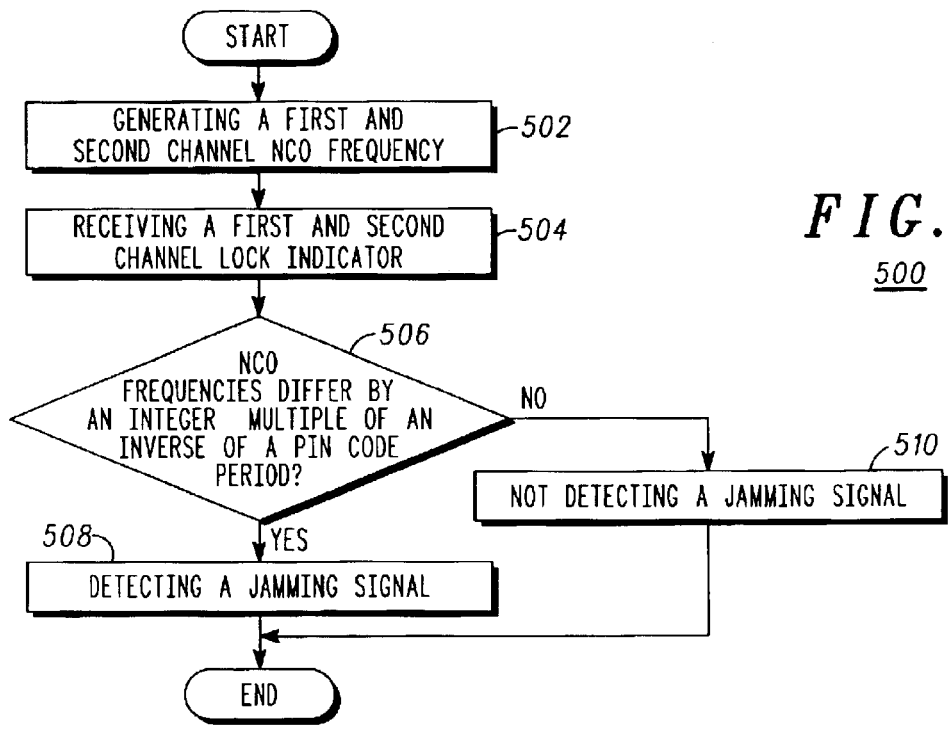
FIG. 5 is a flow chart of a method according to an embodiment of the invention.

FIG. 5 is a flow chart 500 of a method according to an embodiment of the invention. In step 502, first channel NCO frequency 428 and second channel, NCO frequency 429 are generated by NCO 416, 417 respectively. The first and second channel NCO frequency 428, 429 are controlled by frequency tracking loop 432. In step 504, jamming detection module 434 receives first channel lock indicator 430 indicating that first channel NCO frequency 428 is locked and tracking a signal within its effective passband 306. Also in step 504, jamming detection module 434 receives second channel lock indicator 431 indicating that second channel NCO frequency 429 is locked and tracking a signal within its effective passband 306.

In step 506, it is determined by jamming detection module 434 if first channel NCO frequency 428 and second channel NCO frequency 429 differ by an integer multiple of an inverse of a PN code period 424, 425. If so, a jamming signal 304 is detected per step 508. If not, no jamming signal 304 is detected per step 510.

Figure 6:
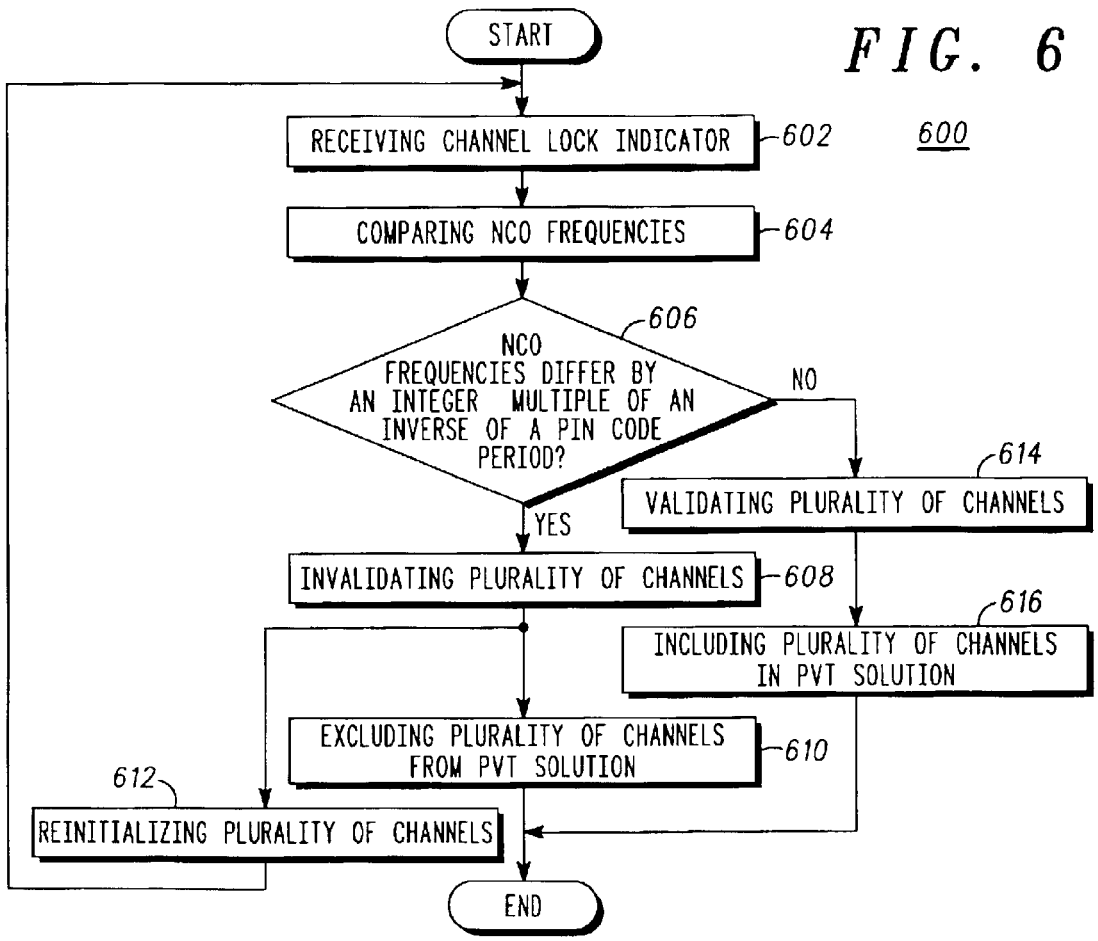
FIG. 6 is a flow chart of method according to another embodiment of the invention.

FIG. 6 is a flow chart 600 of method according to another embodiment of the invention. In step 602, jamming detection module 434 receives channel lock indicator 430, 431 for each of a plurality of GPS channels 401. In step 604, jamming detection module 434 compares the NCO frequencies 428, 429 of each of the plurality of GPS channels 401. In step 606, it is determined by jamming detection module 434 if NCO frequencies 428, 429 differ by an integer multiple of an inverse of a PN code period. If not, plurality of GPS channels 401 are validated per step 614, meaning that an interference condition 303 does not exist and plurality of GPS channels are not locked onto jamming signal 304. Therefore, plurality of GPS channels 401 can be included in a PVT solution 440 per step 616.

If plurality of GPS channels 401 do differ by an integer multiple of an inverse of a PN code period, then plurality of GPS channels 401 are invalidated per step 608, meaning that an interference condition 303 exists and that plurality of GPS channels 401 are locked onto jamming signal 304. If plurality of GPS channels 401 are invalidated they can be excluded from a PVT solution 440 per step 610 and/or GPS receiver 400 can reinitialize plurality of GPS channels 401 per step 612.

While we have shown and described specific embodiments of the present invention, further modifications and improvements will occur to those skilled in the art. It is therefore, to be understood that appended claims are intended to cover all such modifications and changes as fall within the true spirit and scope of the invention.

What is claimed is:

1. In a GPS receiver, a method of detecting an interference condition with a plurality of GPS channels, comprising:
   providing each of the plurality of GPS channels with an NCO frequency;
   receiving a channel lock indicator for each of the plurality of GPS channels;
   comparing the NCO frequencies of each of the plurality of GPS channels to each other; and detecting the interference condition for any of the plurality of GPS channels where the NCO frequencies differ by an integer multiple of an inverse of a pseudorandom noise code period.

2. The method of claim 1, further comprising upon detecting the interference condition reinitializing the plurality of GPS channels.

3. The method of claim 1, wherein detecting the interference condition comprises determining that the plurality of GPS channels are locked onto a jamming signal.

4. The method of claim 1, further comprising upon detecting the interference condition excluding the plurality of GPS channels from a position, velocity, time (PVT) solution.

5. The method of claim 1, wherein the pseudorandom noise code period is substantially 1 millisecond.

6. In a wireless device, a method of detecting a jamming signal comprising:
  generating a first channel NCO frequency;
  generating a second channel NCO frequency;
  receiving a first channel lock indicator;
  receiving a second channel lock indicator; and
  detecting the jamming signal if the first channel NCO frequency and the second channel NCO frequency differ by an integer multiple of an inverse of a pseudorandom noise code period.

7. The method of claim 6, wherein the pseudorandom noise code period is substantially 1 millisecond.

8. In a wireless device, a method of monitoring for a jamming signal comprising:
  generating a first channel NCO frequency;
  generating a second channel NCO frequency;
  receiving a first channel lock indicator;
  receiving a second channel lock indicator; and
  detecting the jamming signal if the first channel NCO frequency and the second channel NCO frequency differ by an integer multiple of an inverse of a pseudorandom noise code period.

9. The method of claim 8, wherein the pseudorandom noise code period is substantially 1 millisecond.

10. A method of detecting a jamming signal in a wireless device, comprising:
  providing a plurality of channels, wherein each of the plurality of channels has an NCO frequency;
  receiving a channel lock indicator for each of the plurality of channels; and
  detecting the jamming signal if the NCO frequency of each of the plurality of channels differs by an integer multiple of an inverse of a pseudorandom noise code period.

11. The method of claim 10, further comprising upon detecting the jamming signal reinitializing the plurality of channels.

12. The method of claim 10, wherein detecting the jamming signal comprises determining that the plurality of channels are locked onto the jamming signal.

13. The method of claim 10, further comprising upon detecting the jamming signal excluding the plurality of channels from a position, velocity, time (PVT) solution.

14. The method of claim 10, wherein the pseudorandom noise code period is substantially 1 millisecond.

15. The method of claim 10, wherein the plurality of channels are a plurality of GPS channels.

16. In a wireless device, a method of validating a plurality of channels, comprising:
  providing a plurality of channels, wherein each of the plurality of channels has an NCO frequency;
  receiving a channel lock indicator for each of the plurality of channels;
  comparing the NCO frequencies of each of the plurality of channels to each other;
  invalidating any of the plurality of channels where the NCO frequencies differ by an integer multiple of an inverse of a pseudorandom noise code period; and
  validating any of the plurality of channels where the NCO frequencies do not differ by an integer multiple of the inverse of the pseudorandom noise code period.

17. The method of claim 16, wherein invalidating the plurality of channels comprises reinitializing the plurality of channels.

18. The method of claim 16, wherein invalidating the plurality of channels comprises determining that the plurality of channels are locked onto a jamming signal.

19. The method of claim 16, wherein invalidating the plurality of channels comprises excluding the plurality of channels from a position, velocity, time (PVT) solution.

20. The method of claim 16, wherein validating the plurality of channels comprises including the plurality of channels in a position, velocity, time (PVT) solution.

21. The method of claim 16, wherein the pseudorandom noise code period is substantially 1 millisecond.

22. The method of claim 16, wherein the plurality of channels are a plurality of GPS channels.

23. A computer-readable medium containing computer instructions for instructing a processor to perform a method of detecting a jamming signal in a wireless device, the instructions comprising:
  providing a plurality of channels, wherein each of the plurality of channels has an NCO frequency;
  receiving a channel lock indicator for each of the plurality of channels; and
  detecting the jamming signal if the NCO frequency of each of the plurality of channels differs by an integer multiple of an inverse of a pseudorandom noise code period.

24. The method of claim 23, further comprising upon detecting the jamming signal reinitializing the plurality of channels.

25. The method of claim 23, wherein detecting the jamming signal comprises determining that the plurality of channels are locked onto the jamming signal.

26. The method of claim 23, further comprising upon detecting the jamming signal excluding the plurality of channels from a position, velocity, time (PVT) solution.

27. The method of claim 23, wherein the pseudorandom noise code period is substantially 1 millisecond.

28. The method of claim 23, wherein the plurality of channels are a plurality of GPS channels.

29. In a GPS receiver, a computer-readable medium containing computer instructions for instructing a processor to perform a method of detecting an interference condition with a plurality of GPS channels, the instructions comprising:
  providing each of the plurality of GPS channels with an NCO frequency;
  receiving a channel lock indicator for each of the plurality of GPS channels;
  comparing the NCO frequencies of each of the plurality of GPS channels to each other; and
  detecting the interference condition for any of the plurality of GPS channels where the NCO frequencies differ by an integer multiple of an inverse of a pseudorandom noise code period.

30. The method of claim 29, further comprising upon detecting the interference condition reinitializing the plurality of GPS channels.

31. The method of claim 29, wherein detecting the interference condition comprises determining that the plurality of GPS channels are locked onto a jamming signal.

32. The method of claim 29, further comprising upon detecting the interference condition excluding the plurality of GPS channels from a position, velocity, time (PVT) solution.

33. The method of claim 29, wherein the pseudorandom noise code period is substantially 1 millisecond.

34. The method of claim 29, wherein the plurality of channels are a plurality of GPS channels.

35. A wireless device, comprising:
  a plurality of channels, wherein each of the plurality of channels has an NCO frequency;
  a frequency tracking loop for each of the plurality of channels, wherein the frequency tracking loop outputs a channel lock indicator for each of the plurality of channels; and
  a jamming detection module, wherein the jamming detection module receives the channel lock indicator and the NCO frequency from each of the plurality of channels, and wherein the jamming detection module detects an interference condition if the NCO frequency of each of the plurality of channels differs by an integer multiple of an inverse of a pseudorandom noise code period.

36. The wireless device of claim 35, wherein the pseudorandom noise code period is substantially 1 millisecond.

37. The wireless device of claim 35, wherein the plurality of channels are a plurality of GPS channels.

38. The wireless device of claim 35, wherein the interference condition indicates the plurality of channels are locked onto a jamming signal.

39. The wireless device of claim 35, wherein when the jamming detection module detects an interference condition the plurality of channels are excluded from a position, velocity, time (PVT) solution.

40. The wireless device of claim 35, wherein when the jamming detection module detects an interference condition the plurality of channels are reinitialized.

* * * * *